Figure 3:
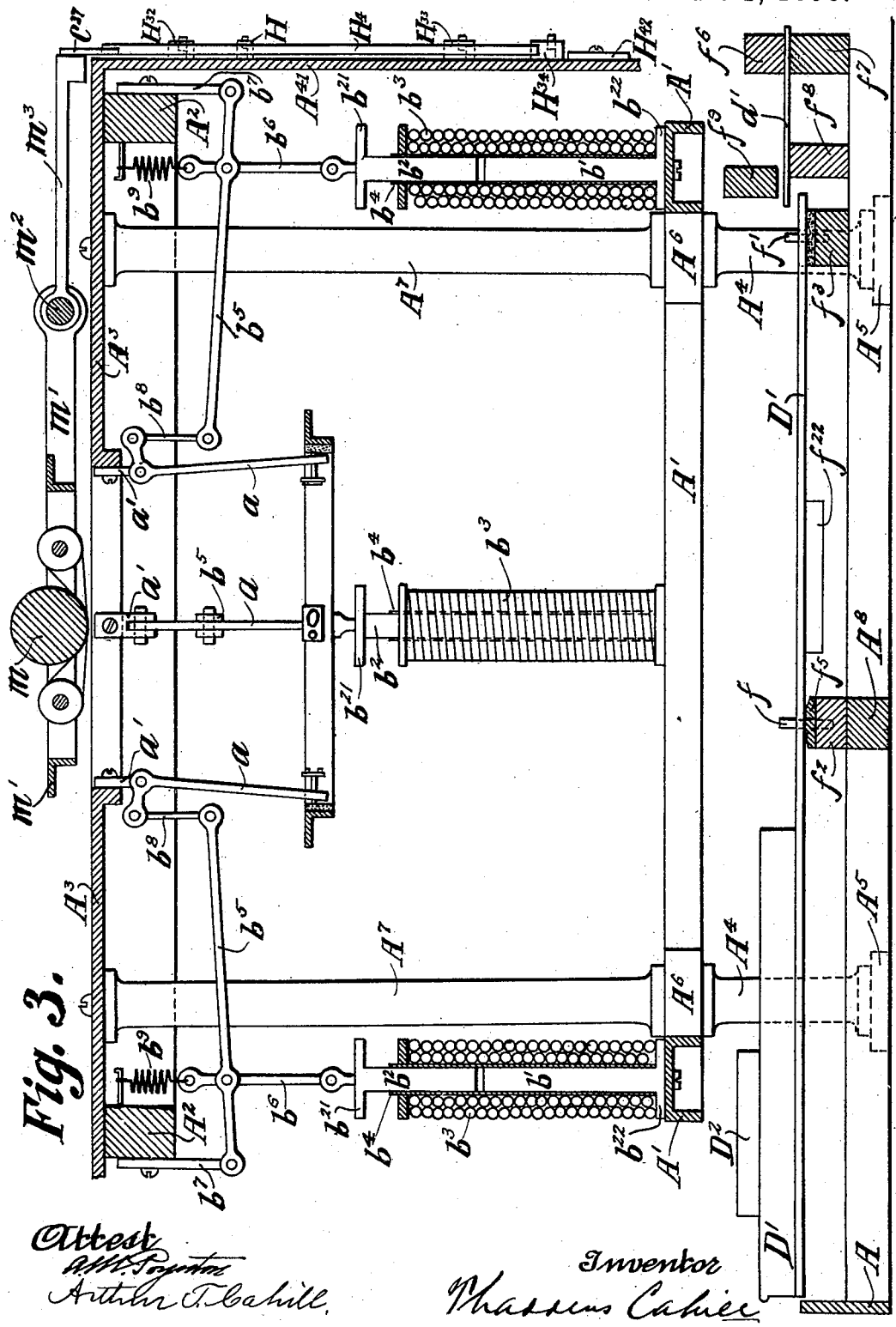

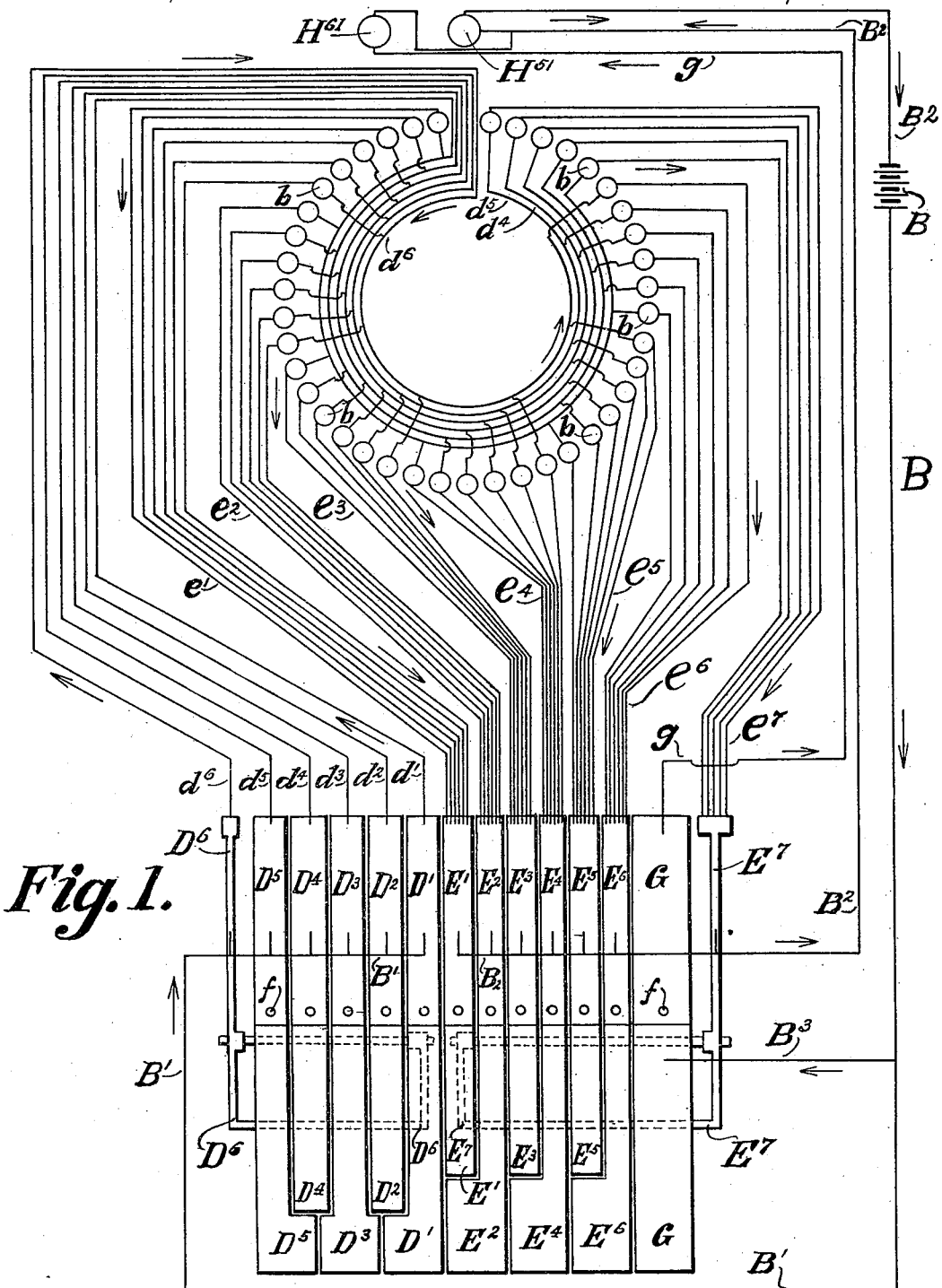

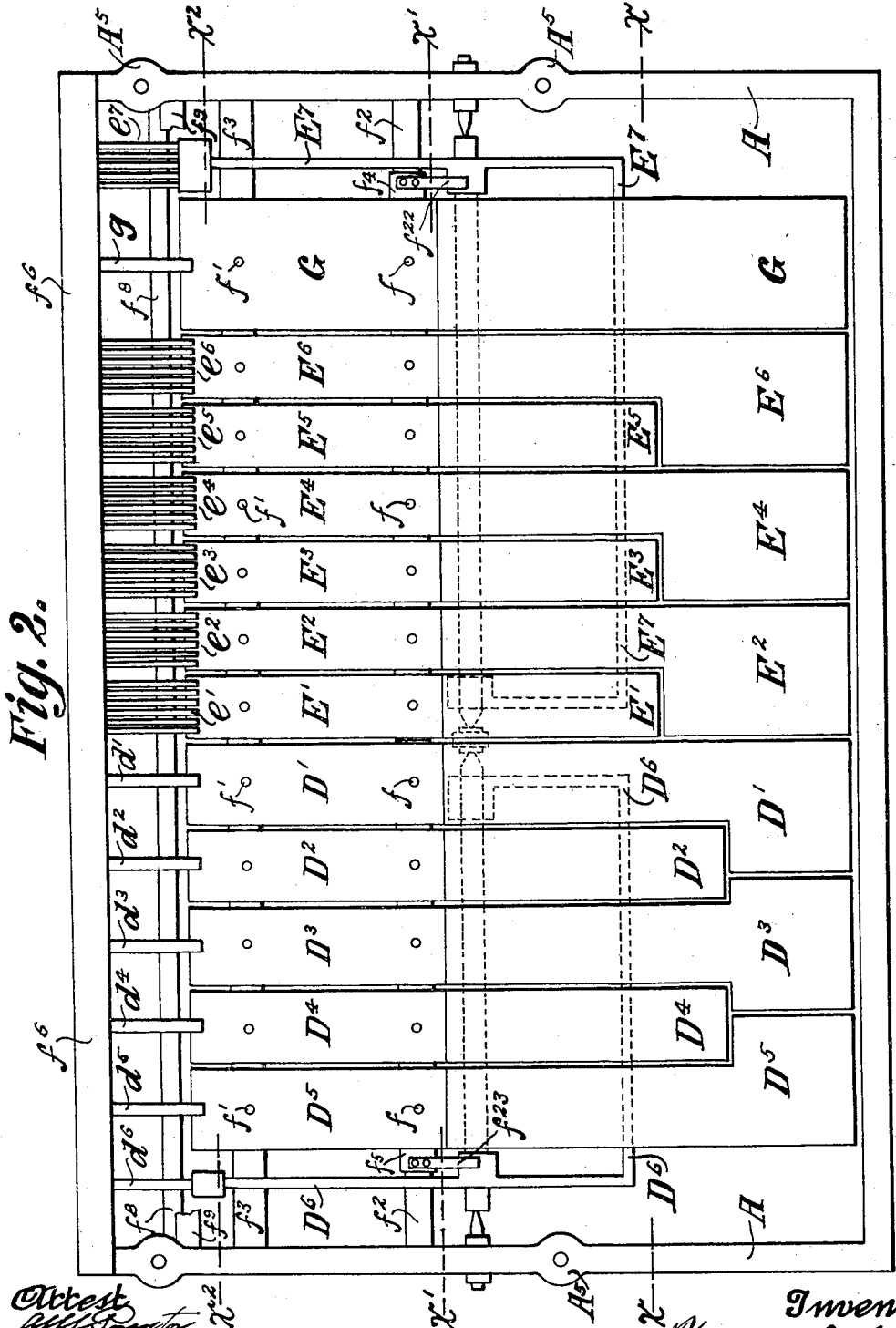

(No Model.)
T. CAHILL.
TYPE WRITING MACHINE.
No. 600,119.
Patented Mar. 1, 1898.
8 Sheets—Sheet 3
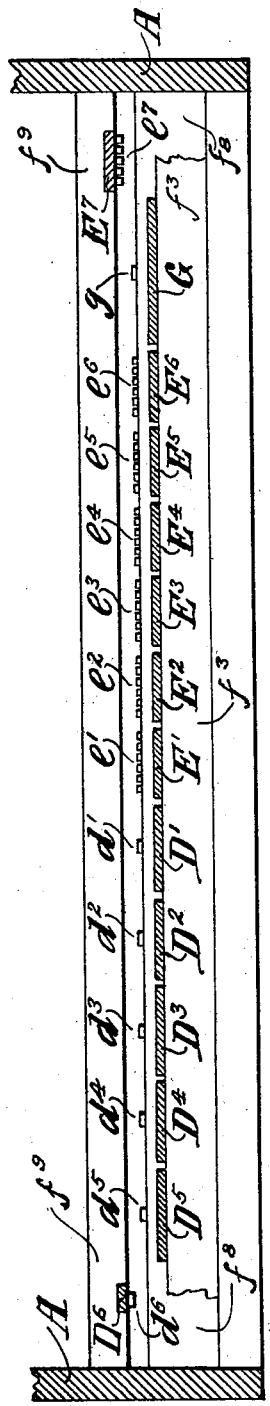
Fig. 2ᶜ
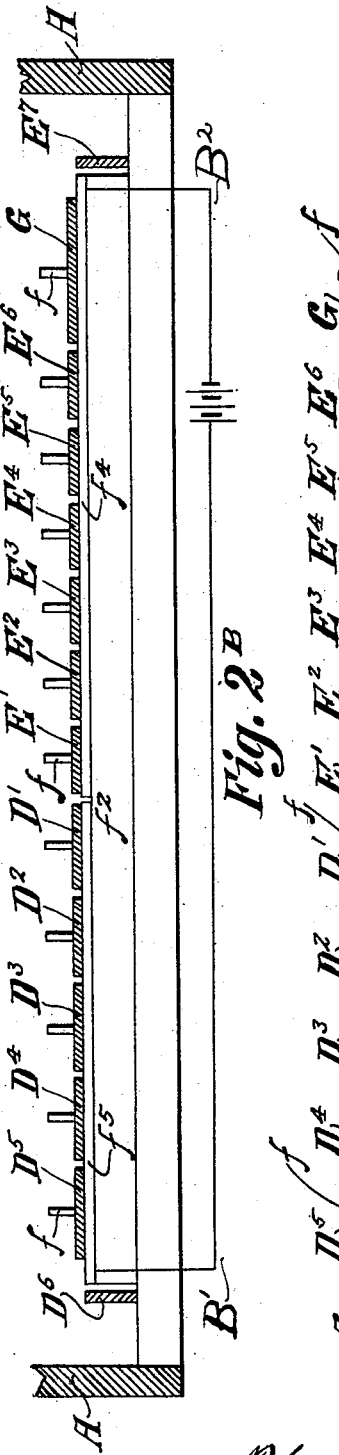
Fig. 2ᴮ
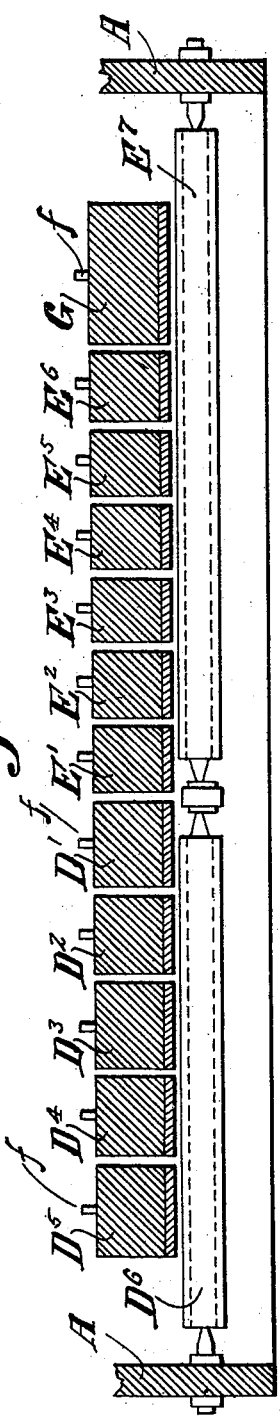
Fig. 2ᴬ

(No Model.)  
8 Sheets—Sheet 4.

T. CAHILL
TYPE WRITING MACHINE.

No. 600,119.  
Patented Mar. 1, 1898.

Attest  
Inventor (No Model.) 8 Sheets—Sheet 5.

T. CAHILL.
TYPE WRITING MACHINE.

No. 600,119. Patented Mar. 1, 1898.

(No Model.)  8 Sheets—Sheet 6.

T. CAHILL.
TYPE WRITING MACHINE.

No. 600,119. Patented Mar. 1, 1898.

Attest:
A. W. Poynton
Arthur T. Cahill.

Inventor
Thaddeus Cahill

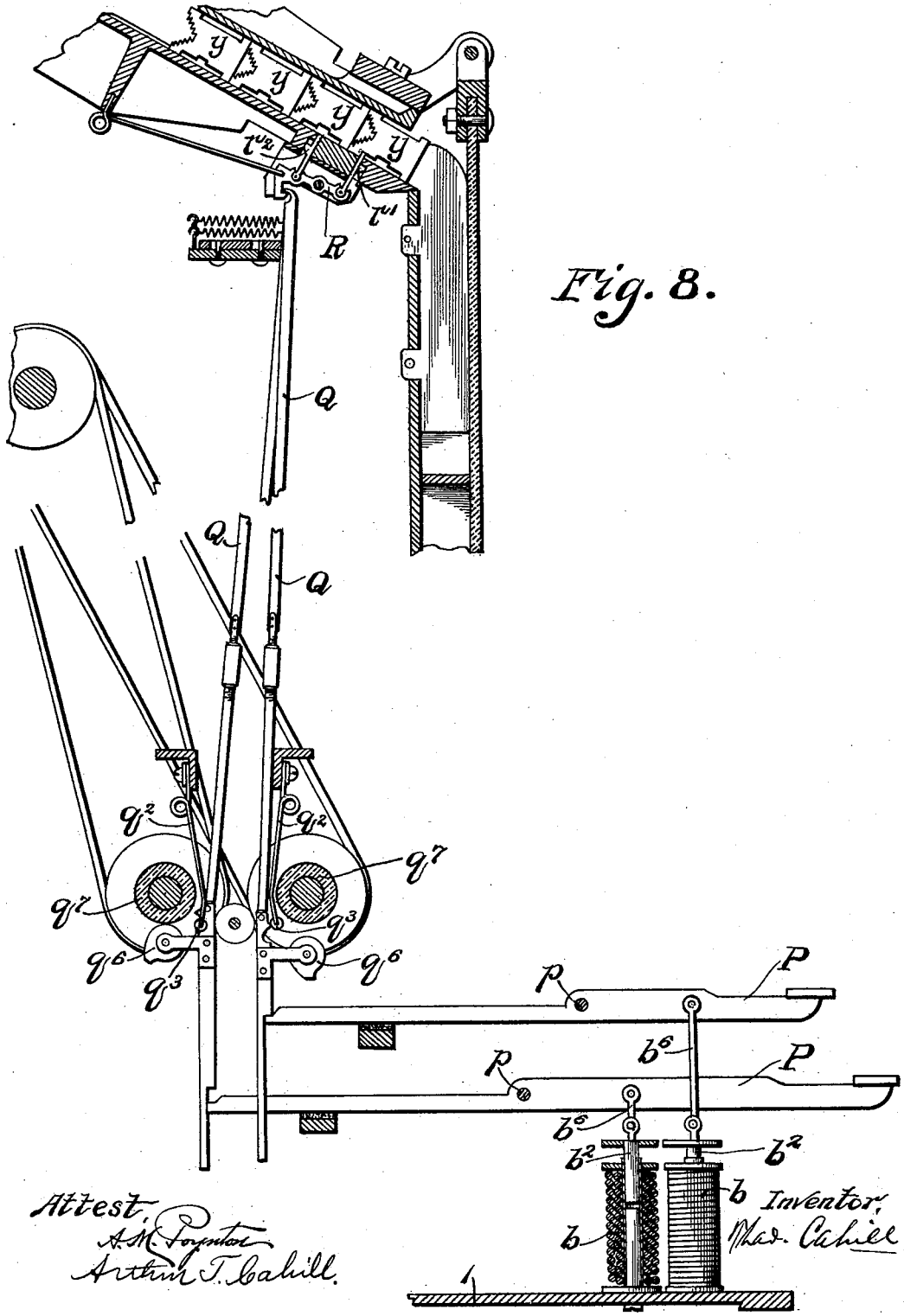

(No Model.)
T. CAHILL.
TYPE WRITING MACHINE.
No. 600,119.  Patented Mar. 1, 1898.
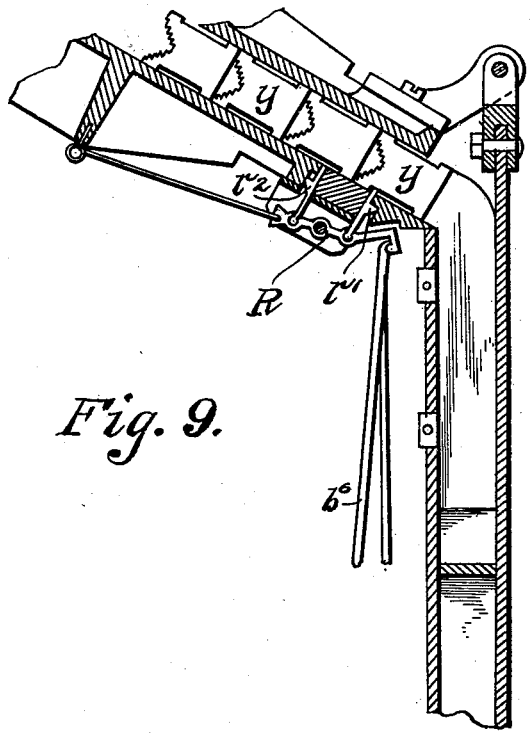
Fig. 9.
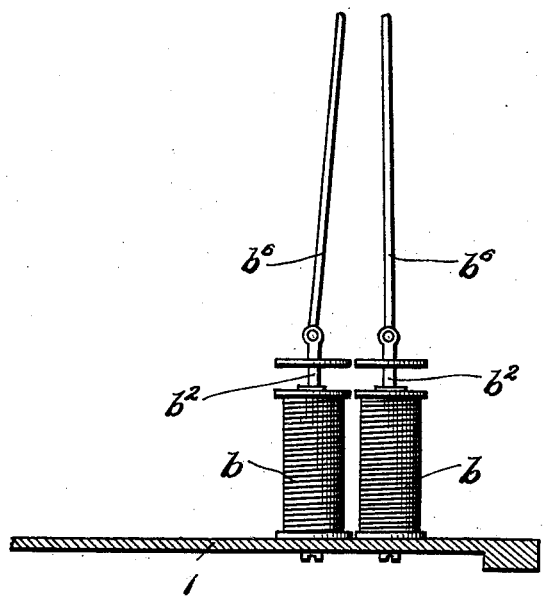

UNITED STATES PATENT OFFICE.

THADDEUS CAHILL, OF NEW YORK, N. Y., ASSIGNOR TO HIMSELF, AMOS J. CUMMINGS, GEORGE F. CAHILL, ARTHUR T. CAHILL, AND E. HILTON JACKSON, TRUSTEES.

TYPE-WRITING MACHINE.

SPECIFICATION forming part of Letters Patent No. 600,119, dated March 1, 1898.

Application filed December 14, 1895. Serial No. 572,121. (No model.)

*To all whom it may concern:*

Be it known that I, THADDEUS CAHILL, a citizen of the United States, and a resident of the city, county, and State of New York, residing temporarily at Washington, in the District of Columbia, have invented certain new and useful Improvements in Type-Writing Machines and other Key-Operated Instruments, of which the following is a specification.

The object of my invention is to increase the amount of work which may be done by an operator upon an instrument of the kind described in a given time—in other words, to increase the ease and the rapidity of operation.

My invention is applicable to type-writing machines, type-setting and linotype machines, printing-telegraphs, and probably to other devices. I shall first describe my invention as applied to a type-writing machine, which is the purpose for which I originally contrived it, and after the invention has been made clear as applied to a type-writing machine I will point out how it may be used in connection with type-setting machines and other devices.

In type-writing machines as ordinarily constructed, and the same is true of type-setting machines, a great number of keys are employed. In most machines there is a key for every character. In some common types of machine, however, each key serves for two characters, the change from one character to another being effected by means of a "shift," and in some other machines two shifts are used, so that a single key is made to serve for three characters. Even in these machines, however, a large number of keys are employed. By reducing the number of keys to a small number and employing the keys individually for the most frequently occurring characters and in various combinations for the less frequently occurring characters it becomes possible to increase very materially the speed of the machine. The movement of the hands from key to key is reduced, and it no longer becomes necessary to use the eyes upon the keys, and thus the operator having his eyes free for use upon the copy and needing to make small movements only as compared with the movements required over a large keyboard is able to print with greater ease and rapidity. The advantage resulting from reducing the number of keys has long been recognized, and several mechanisms have been devised for taking advantage of it. Such mechanisms or instrumentalities are commonly designated as "selecting" devices.

My present invention may be described, briefly and informally, (the formal statement of invention is to be found in the paragraphs of claim at the end of this specification,) as consisting, essentially, of a selecting device of improved construction controlled by a few keys and serving to control a much larger number of electromagnets, the different individual keys and the different combinations of keys serving to call different magnets into activity and the magnets being combined with and serving to control the type-carriers of a type-writing machine or the key-levers or other suitable parts of a type-setting or linotype machine. This is the most important part of my invention.

Other features of my invention relate to the construction and arrangement of the letter-spacing mechanism, and particularly to the combinations of parts by which the interverbal space is made simultaneously with a letter.

As compared with prior electrical selecting devices, the object of my present invention is to simplify the structure and increase the ease and rapidity of operation. In prior electrical selecting devices, so far as I am informed, either (*a*) the keys position certain parts, which must be arrested and held in their positions before the circuit-closers can close their circuits, or (*b*) the keys control a variety of mechanical parts of greater or less complexity and which must be moved into their proper positions before the particular circuit desired can be closed. Of the first class the device of Munson described in Letters Patent No. 246,411, dated August 30, 1881, and No. 352,143, dated November 9, 1886, may be referred to as an example. Of the second class the device of Beyerlen described in Letters Patent No. 331,275, dated December 1, 1885, may be mentioned. Moreover, in these devices and, so far as I am aware, in all previous permutational devices proposed for use in type-writing machines, linotype-machines, type-setting machines, and other similar instruments it is necessary to depress for many of the letters (lower case) three, four, five, or even six keys. I simplify the structure, as will be seen more clearly hereinafter, by making the keys close circuit, simply avoiding all positioning devices, and as there are in my preferred construction no parts to be positioned and no machinery to be operated as a preliminary to the closing of the circuit it becomes possible to close the circuit practically the instant the operator touches the key, so that the operations consequent upon the closing of the circuit are made to take place with the least possible delay. The power exerted by the operator upon the key need only be sufficient to close the circuit, and the circuit is closed, as before mentioned, at the instant the key is touched. Thus the ease and rapidity of operation are increased.

As compared with an ordinary type-writing or type-setting machine the great reduction in the number of keys effected by my invention, together with the greatly-reduced force required to operate them, the small distances through which they are depressed, and the fact that the operator having only a few keys to depress can look uninterruptedly at his copy, tends greatly to increase the speed of operation. Moreover, the controlling elements of my permutational selecting mechanism constitute two distinct groups or sets. Some one of the controlling elements of the one group must always coöperate with some one of the controlling elements of the other group to make any character, and each character is made by the coacting of two controlling elements belonging one to the one group and the other to the other group, and it is never necessary to bring more than two controlling elements into action nor to depress more than two keys to make any character lower case.

With this preliminary explanation of the general object and nature of my invention I shall now proceed to describe in detail the structure that I prefer to employ in carrying it out. As before said, I will first describe the invention as applied to a type-writing machine.

Figure 4:
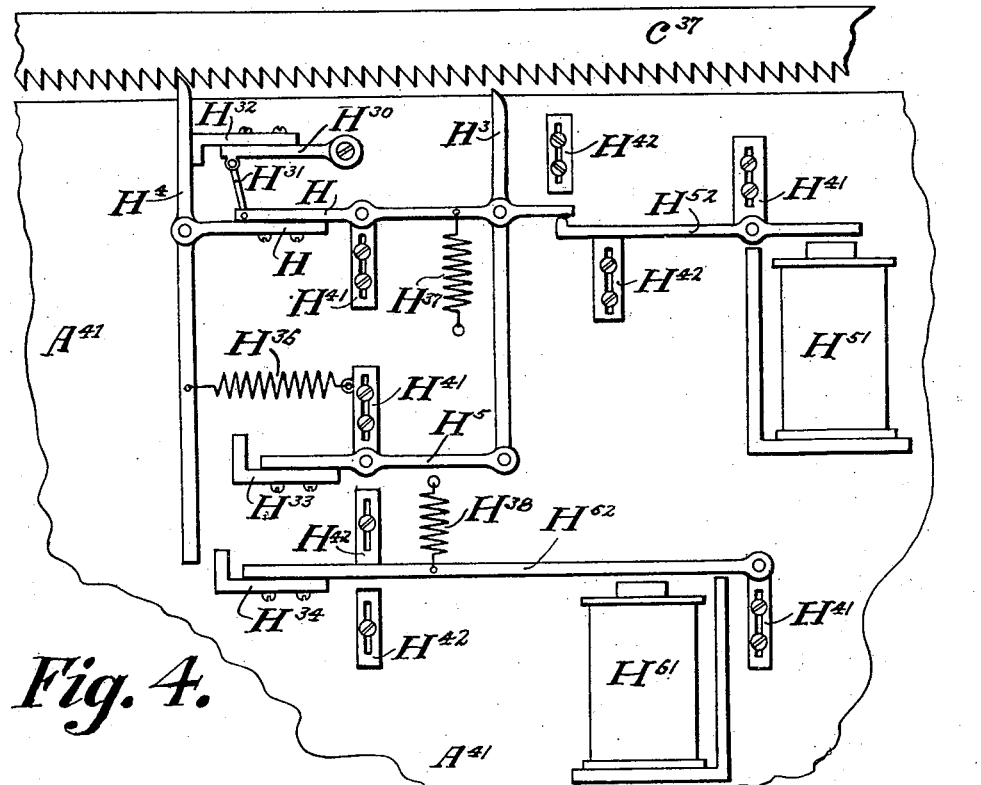
Figure 7:
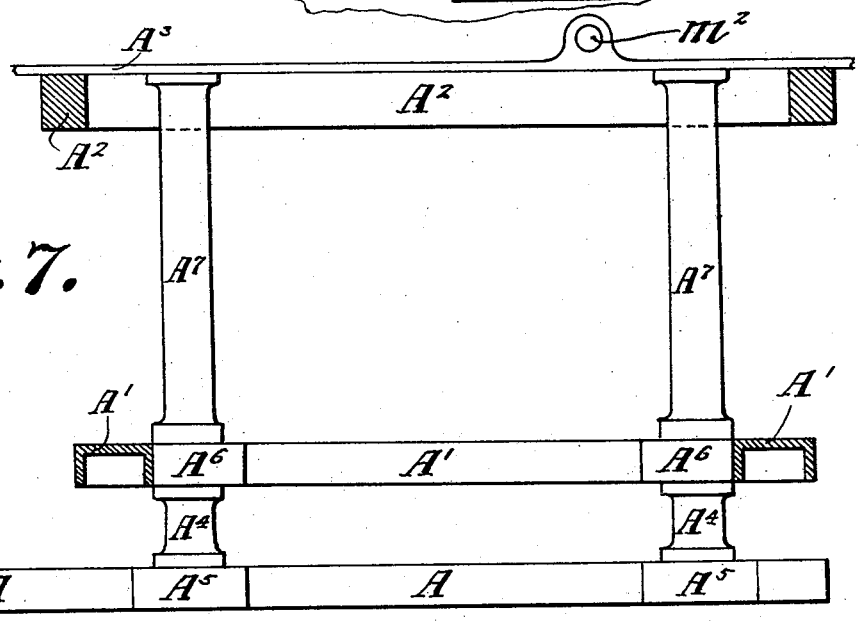
Figure 6:
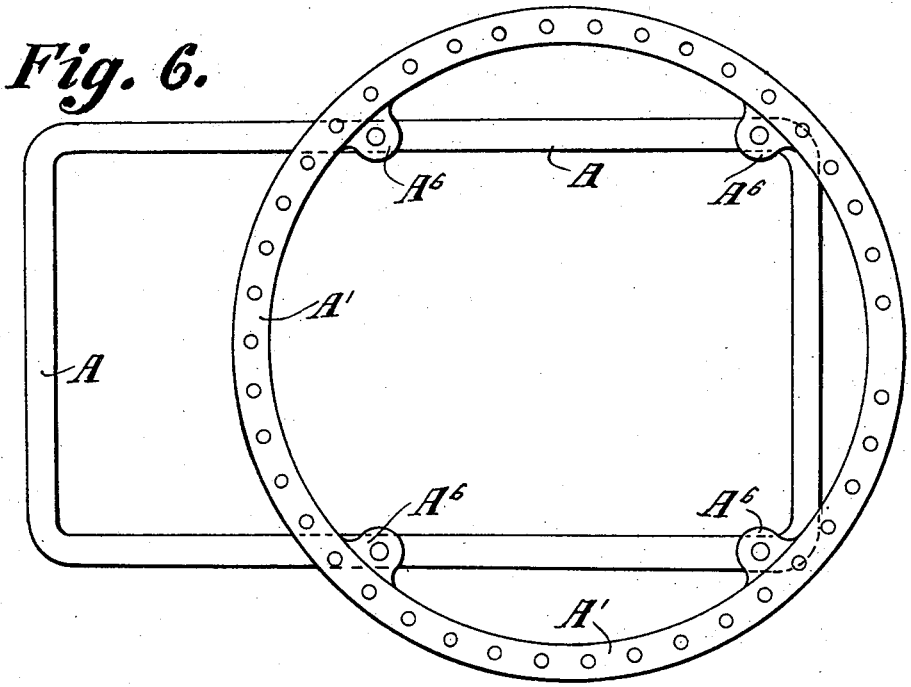
Figure 5:
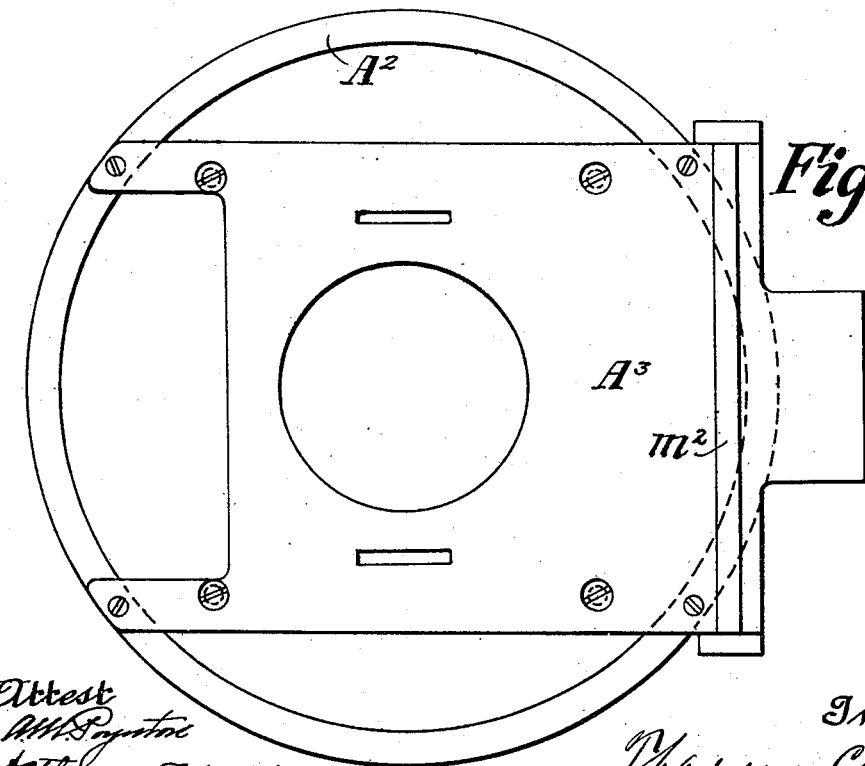

Figure 1 is a diagrammatic view with the keyboard in plan, illustrating the electrical connections of a set of keys and magnets employed in carrying out my invention. Fig. 2 is a plan view illustrating the mechanical arrangement of the keys, circuit-controlling frames, and coacting contact-pieces. Figs. $2^A$, $2^B$, and $2^C$ are sectional views, partly in elevation, on the lines $x\,x$, $x'\,x'$, and $x^2\,x^2$, respectively, Fig. 2. Fig. $2^A$ is intended to illustrate the relations subsisting between the various keys and the circuit-controlling frames $D^6$ and $E^7$, hereinafter described, and the construction of the keys, formed each partly of wood and partly of conducting metal. Fig. $2^B$ is intended to illustrate the relation between the various keys and the conducting-strips $f^4$ and $f^5$, and Fig. $2^C$ is intended to illustrate the relations normally subsisting between the various keys and the circuit-closing frames $D^6$ and $E^7$ on the one hand and the contact-pieces with which they close circuit on the other hand, and particularly to make clear the fact that the various keys are normally out of connection with the corresponding contact-pieces, while the circuit-closing frames $D^6$ and $E^7$ are normally in connection with the contact-pieces corresponding to them. Fig. 3 is a sectional view, partly in elevation, through the center of a type-writing machine constructed according to my invention, the plane of section being parallel to the length of the keys and transverse to the paper-carriage through the center of the machine, and in this view a few only of the electromagnets, with the corresponding type-bars and intermediate parts, are illustrated, the major portion being omitted for greater clearness and convenience. Fig. 4 is a detail rear elevation illustrating the spacing mechanism. Figs. 5, 6, and 7 are detail views illustrating the construction of the main frame which I prefer to use in applying my invention to a type-writing machine. Fig. 5 is a top view illustrating the top plate of the machine with the ring attached to the top plate and serving to support the flanges by which the levers, hereinafter described, operated by the electromagnets and serving to transmit motion to the type-bars, are supported. Fig. 6 is a detail top view illustrating the magnet-carrying ring attached to the top plate; and Fig. 7 is a detail view, partly in elevation and partly in section, illustrating the construction by which the principal parts of the main frame are bound together. Figs. 8 and 9 are diagrammatic sectional views, partly in elevation, illustrating the electromagnets belonging to my selecting device connected to operate the escapement devices of a Mergenthaler linotype-machine. Fig. 8 shows the electromagnets connected to operate the key-levers of a linotype-machine, and Fig. 9 shows the electromagnets connected direct to the escapement devices of a linotype-machine.

The various figures illustrate clearly the principle of the invention and so much of mechanical detail as is necessary to that end; but the drawings are not made to scale, and mechanical details of form and proportion are sacrificed for the sake of greater clearness in illustrating essential principles.

The structure figured in the drawings in illustration of my invention may be described, briefly, as consisting, essentially, of (a) a multiplicity of electromagnets, (b) a smaller number of keys controlling these magnets, and (c) type-carriers operated by the electromagnets.

The machine is provided with a suitable paper-carriage, ribbon mechanism, and spacing mechanism. All these mechanical details, as well as the arrangement of type-carriers, which are preferably hinged levers disposed around a circle and striking all to a common center, are modeled in the device figured in the drawings on the corresponding features of the machine long known in the art and trade as the "Remington Standard Type-Writer." These details may be modified, however, to any extent, for they do not constitute essential features of the invention. The ribbon mechanism is entirely omitted in the drawings, and the arrangement of type-bars and the carriage and spacing mechanism are only shown so far as is necessary to illustrate those things in which my invention properly consists.

The main frame consists, essentially, of (a) a bed-plate, marked A; (b) a magnet-carrying-ring A', preferably of non-magnetic material, made concentric with the circle of type-levers; (c) a ring $A^2$, to which the flanges are connected which support the multiplying-levers operated by the electromagnets and serving to transmit motion from them to the type-bars, and (d) the top plate $A^3$ of the machine, to which the various type-levers, the carriage, the ribbon mechanism, &c., are connected in the usual manner. This top plate $A^3$ has at the back a downward extension $A^{41}$, which serves to support the spacing mechanism. Columns or standards $A^4 A^4$, fastened by bolts or machine-screws to lugs $A^5 A^5$, projecting from the bed-plate A, and to other lugs $A^6 A^6$, projecting inwardly from the magnet-carrying ring A', serve to support the magnet-carrying ring A' and its magnets. The ring $A^2$, which supports the levers connecting the magnets with their proper type-levers, is screwed fast to the top plate $A^3$, and the top plate is supported by columns $A^7 A^7$, attached fast to the lugs $A^6 A^6$ of the magnet-carrying ring A' below and to the top plate itself above. Thus the main frame is bound together. The details of construction of the main frame, however, it is to be understood, are entirely immaterial so far as the principle of my invention is concerned.

The type-bars $a\, a$, each of which carries an upper-case and a lower-case character, are supported by means of flanges or hangers $a'\, a'$, of any suitable construction, screwed fast to the top plate in the usual fashion. The electromagnets $b\, b$ consist each essentially of a fixed core $b'$, bolted fast to the magnet-carrying ring, a movable core or armature $b^2$, and a coil of insulated wire $b^3$, surrounding the parts $b'$ and $b^2$. The wire is wound upon a hollow tube $b^4$, provided with retaining-heads. The armature $b^2$ is connected with a multiplying-lever $b^5$ by a link $b^6$. Said multiplying-lever $b^5$ is supported by a flange or hanger $b^7$, screwed fast to the ring $A^2$, and is connected by a link $b^8$ with the corresponding type-carrying lever $a$. The whole arrangement is such that when the magnet is energized by passing an electric current through the coil $b^3$ the armature $b^2$ is attracted by the fixed core $b'$ and moves toward it, so moving the multiplying-lever $b^5$ and pulling upon the link $b^8$, which in turn pulls down the short end of the type-lever $a$ and throws the type up forcibly against the paper carried by the paper-roll $m$. A contractile spring $b^9$ serves to return the parts to the normal position when the circuit of the magnet is broken.

I prefer to employ the arrangement of magnet illustrated in the drawings, having a fixed core and a movable cylindrical armature, both lying inside the energizing-coil, for when properly constructed this form of electromagnet reduces the disadvantageous magnetic leakage to a minimum, gives a pull through a considerable distance, and having its magnetic circuit largely of air loses its magnetism instantly the circuit is broken, and so works with great rapidity. I have found it peculiarly advantageous for operating the type-bars; but any other suitable form of electromagnet whatever may be substituted for it. The enlarged heads $b^{21}$ and $b^{22}$ of the fixed core $b'$ and the armature $b^2$, respectively, are made large, so that they give a good return-circuit through air of the magnetic lines of force. By this arrangement the total reluctance of the magnetic circuit is kept within moderate limits, and at the same time, the magnetic circuit including an air-return path for the lines of force, the device operates with great rapidity.

With this brief preliminary description of the mechanism we will now consider the arrangement of the electric circuits and the controlling-keys. (See particularly Figs. 1, 2, $2^A$, $2^B$, and $2^C$.)

The keys of the keyboard fall naturally into two groups or classes. Those of the first group are marked $D'$, $D^2$, $D^3$, $D^4$, and $D^5$, and those of the second group are marked, respectively, $E'$, $E^2$, $E^3$, $E^4$, $E^5$, and $E^6$. A circuit-controlling frame $D^6$ lies underneath the keys $D'$, $D^2$, $D^3$, $D^4$, and $D^5$, so that it is operated by them, and a similar frame $E^7$ lies underneath the keys $E'$, $E^2$, $E^3$, $E^4$, $E^5$, and $E^6$, so that it is operated by them.

The magnets $b\, b$, &c., of which there are forty-one in the device figured in the drawings, when considered with regard to the keys $E'\, E^2\, E^3\, E^4\, E^5\, E^6$ and the frame $E^7$ fall naturally into seven groups, corresponding, respectively, with the seven parts $E'$, $E^2$, $E^3$, $E^4$, $E^5$, $E^6$, and E, and the magnets of each such group have each one terminal arranged in juxtaposition to the key $E'\, E^2\, E^3$, &c., or frame $E^7$, as the case may be, corresponding to such group, so that each of the keys $E'\, E^2$, &c., and the frame $E^7$ can close circuit with such magnets. The terminal wires mentioned of the magnets corresponding to the key $E'$ are marked $e'$, those corresponding to the key $E^2$ are marked $e^2$, those corresponding to the key $E^3$ are marked $e^3$, those corresponding to the key $E^4$ are marked $e^4$, those corresponding to the key $E^5$ are marked $e^5$, those corresponding to the key $E^6$ are marked $e^6$, and those corresponding to the frame $E^7$ are marked $e^7$.

When considered with regard to the keys $D'$ $D^2$ $D^3$ $D^4$ $D^5$ and the frame $D^6$, the magnets $b$ $b$ fall naturally into six groups, corresponding, respectively, to the six circuit-controllers $D'$, $D^2$, $D^3$, $D^4$, $D^5$, and $D^6$, and all the magnets of each such group have one terminal connected with a wire leading to the corresponding key $D'$ $D^2$ $D^3$ $D^4$ $D^5$ or frame $D^6$. The wires $d'$, $d^2$, $d^3$, $d^4$, $d^5$, and $d^6$ correspond, respectively, with the parts $D'$, $D^2$, $D^3$, $D^4$, $D^5$, and $D^6$, and said wires have each one end lying in proximity to the corresponding key $D'$ $D^2$ $D^3$ $D^4$ $D^5$ or frame $D^6$, so that each of the parts last named serves to make and break connection with the corresponding wire $d'$ $d^2$, &c., and the magnets corresponding to key $D'$ have each one terminal connected with the wire $d'$, the magnets corresponding to key $D^2$ have each one terminal connected with the wire $d^2$, the magnets corresponding with key $D^3$ have each one terminal connected with wire $d^3$, the magnets corresponding with key $D^4$ have each one terminal connected with the wire $d^4$, the magnets corresponding with the key $D^5$ have each one terminal connected with the wire $d^5$, and the magnets corresponding with the frame $D^6$ have each one terminal connected with the wire $d^6$.

The circuit-controllers marked, respectively, $E'$, $E^2$, $E^3$, $E^4$, $E^5$, $E^6$, and $E^7$ may be termed for convenience sake the "E group," and the circuit-controllers $D'$, $D^2$, $D^3$, $D^4$, $D^5$, and $D^6$ may in like manner be termed the "D group." Every one of the magnets $b$ $b$, &c., it will be seen, has one of its terminals in make-and-break relation with some one of the circuit-controllers of the D group and its other terminal in make-and-break relation with some one of the circuit-controllers of the E group. All of the keys $D'$ $D^2$ $D^3$ $D^4$ $D^5$ and the frame $D^6$ are connected with one terminal wire $B'$ of the battery B, and in like manner all the keys $E'$ $E^2$ $E^3$ $E^4$ $E^5$ $E^6$ and the frame $E^7$ are connected with the other terminal $B^2$ of the battery B, the spacing-magnet $H^{51}$, hereinafter described, being also included in the circuit. The six groups of magnets having terminals connected, respectively, with the keys $E'$, $E^2$, $E^3$, $E^4$, $E^5$, and $E^6$ preferably include six magnets each, and the six magnets of each group are connected, respectively, one with the wire $d'$, leading to key $D'$; one with the wire $d^2$, leading to key $D^2$; one with the wire $d^3$, leading to key $D^3$; one with the wire $d^4$, leading to key $D^4$; one with the wire $d^5$, leading to key $D^5$, and one with the wire $d^6$, leading to circuit-controlling frame $D^6$.

The group of magnets having terminals connected with the circuit-controlling frame $E^7$ contains only five magnets, and these have their terminals connected, respectively, one with the wire $d'$, another with the wire $d^2$, another with the wire $d^3$, another with the wire $d^4$, and another with the wire $d^5$. In other words, the group of magnets connected with the frame $E^7$ differs from the groups connected with the keys $E'$, $E^2$, $E^3$, $E^4$, $E^5$, and $E^6$ in that it has no magnet connected with the wire $d^6$, controlled by the frame $D^6$. In their normal positions the frame $D^6$ makes connection with the wire $d^6$, and the frame $E^7$ makes connection with the wires $e^7$; but when any of the keys $D'$, $D^2$, $D^3$, $D^4$, or $D^5$ are depressed they rock the frame $D^6$, so that it breaks connection with its wire $d^6$, and when any of the keys $E'$, $E^2$, $E^3$, $E^4$, $E^5$, or $E^6$ are depressed they rock the frame $E^7$, so that it breaks connection with its wires $e^7$. Each of the keys $D'$, $D^2$, $D^3$, $D^4$, and $D^5$, on the contrary, when in its normal position is out of connection with its wire $d'$ $d^2$, &c., (as the case may be,) but when acted on by the operator closes circuit with its wire, the key $D'$ closing circuit with wire $d'$, key $D^2$ with wire $d^2$, key $D^3$ with wire $d^3$, key $D^4$ with wire $d^4$, and key $D^5$ with wire $d^5$, as before pointed out. In like manner the keys $E'$, $E^2$, $E^3$, $E^4$, $E^5$, and $E^6$ when in their normal position do not make connection with the wires $e'$ $e^2$ $e^3$, &c., corresponding to them; but when any of these keys is acted on by the operator it makes connection with the corresponding wires belonging to the corresponding group of magnets, the various keys $E'$, $E^2$, $E^3$, $E^4$, $E^5$, and $E^6$ making connection, respectively, with the wires $e'$, $e^2$, $e^3$, $e^4$, $e^5$, and $e^6$, as before said.

The printing of the different letters is effected by energizing the corresponding magnets—that is to say, by energizing the magnets connected, respectively, with the different type-bars $a$ $a$ $a$, which carry the letters to be printed. To energize any magnet, it is thrown in circuit with the battery B, and each magnet is in circuit with the battery when the particular circuit-controller of the E group ($E'$, $E^2$, $E^3$, $E^4$, $E^5$, $E^6$, or $E^7$, as the case may be) which corresponds to such magnet makes connection with one terminal wire of said magnet and when also the particular circuit-controller ($D'$, $D^2$, $D^3$, $D^4$, $D^5$, or $D^6$, as the case may be) of the D group corresponding to such magnet makes connection with the corresponding wire ($d'$, $d^2$, $d^3$, $d^4$, $d^5$, or $d^6$, as the case may be) with which the other terminal of said magnet is connected.

If we were to substitute for the frame $D^6$ a key similar to the other keys $D'$ $D^2$, &c., and for the frame $E^7$ a key similar to the other keys $E'$ $E^2$, &c., it would be necessary always to depress two keys to energize any magnet or to print any letter, and every different combination of two keys belonging one to the D group and the other to the E group, of which there would then be forty-two in all, would energize a different magnet. The office of the frames $D^6$ and $E^7$ is to obviate the necessity of depressing two keys to close circuit for a number of magnets corresponding to and serving to print the most frequently occurring letters. Thus the frame $D^6$ makes connection through the wire $d^6$ with one magnet in each of the six groups controlled, respectively, by the keys $E'$, $E^2$, $E^3$, $E^4$, $E^5$, and $E^6$, so that each of these keys may be depressed by itself alone and when so depressed will close circuit through that magnet of its group which has one terminal connected with the wire $d^6$. In like manner the frame $E^7$ makes connection through the wires $e^7$ with one magnet in each of the five groups connected, respectively, with the wires $d'$, $d^2$, $d^3$, $d^4$, and $d^5$ and controlled, respectively, by the keys $D'$, $D^2$, $D^3$, $D^4$, and $D^5$, so that each of these keys may be depressed by itself alone and when so depressed will close circuit through that magnet of its group which has one terminal connected with the frame $E^7$. Thus every key is made capable of printing a letter by itself alone, and a large number of the most frequently occurring letters, forming in the aggregate more than three-quarters of the letters in an average page, are made by the depressing of a single key. The other and less frequently occurring letters and other characters are made by depressing simultaneously two keys, one belonging to the D group and the other belonging to the E group, and when any two keys belonging one to the D group and the other to the E group are depressed simultaneously that magnet is energized which has one terminal connected with the one key depressed and the other terminal connected with the other key depressed, and it is to be remembered, as before pointed out, that depressing any of the keys of the D group breaks the connection between the frame $D^6$ and the wire $d^6$, and depressing any of the keys of the E group in like manner breaks the connection between the frame $E^7$ and its wires $e^7$.

The different keys and the different combinations of keys may be made to print the different letters and other characters in any order desired. In other words, to each key and to each combination of keys may be assigned such letter or other character as the constructor thinks fit. The principle is simple, the variations endless. Probably no two designers would assign the different characters to the different keys in exactly the same order; but whatever plan of assignment is pursued the whole arrangement should be in general such that the most frequently occurring letters will be produced by the keys or combinations of keys most readily depressed, a regard being had to the normal position of the hand with relation to the various keys.

In making any desired arrangement one has only to remember the following simple rules: To produce any letter by a given key acting individually, place the letter desired on the type-bar controlled by that particular magnet which is energized by depressing such key alone. To produce any letter by a combination of two keys belonging one to the D group and the other to the E group, place such letter on the type-bar controlled by that particular magnet which has one terminal connected with the particular D-group key desired and the other terminal connected with the particular E-group key desired, so that it is energized by the depressing of such two keys simultaneously.

Having thus explained the most essential part of the invention, it will now be proper to advert again to certain mechanical details. These details, while forming no essential part of the invention, are yet convenient to be understood in carrying it out. It will be necessary also to explain the spacing mechanism, its construction, and operation.

The keys, as illustrated in the drawings, are preferably formed each of a lower conducting metal strip and an attached wooden portion. They are centered upon pins $ff$ and held from lateral displacement by guide-pins $f'$ $f'$ after the fashion common in pianos. The pins $ff$ are driven into a wooden bar $f^2$ and the pins $f'$ $f'$ are driven into a bar $f^3$. The wooden bar $f^2$ is attached to the cross-rib of the bed-plate A. Two conducting metal strips $f^4$ and $f^5$, insulated from each other, are placed on top of the bar $f^2$ and are connected with opposite poles of the battery B by wires $B'$ and $B^2$. The keys $E'$, $E^2$, $E^3$, $E^4$, $E^5$, and $E^6$ rest down upon the conducting-strip $f^4$, so that they are electrically connected with it, and the keys $D'$, $D^2$, $D^3$, $D^4$, and $D^5$ rest down upon the conducting-strip $f^5$, so that they are electrically connected with it. Contact-springs $f^{22}$ and $f^{23}$, respectively, riveted or soldered to the metal strips $f^4$ and $f^5$ and bearing down upon the frames $D^6$ and $E^7$ near their centers serve to establish electrical connection between the strips $f^4$ and $f^5$, respectively, and the frames $D^6$ and $E^7$, respectively. The terminal wires $d'$, $d^2$, $d^3$, $d^4$, $d^5$, and $d^6$ (corresponding, respectively, with the keys $D'$ $D^2$ $D^3$ $D^4$ $D^5$ and frame $D^6$) and the groups of terminal wires $e'$, $e^2$, $e^3$, $e^4$, $e^5$, $e^6$, and $e^7$ (corresponding, respectively, with the keys $E'$ $E^2$ $E^3$ $E^4$ $E^5$ $E^6$ and frame $E^7$) are preferably made flat, of elastic material, non-oxidizable in itself or covered with non-oxidizable material, or furnished with contact points or surfaces of non-oxidizable material, such as platinum. Obviously the wires with which the coils $b^3$ $b^3$ are best wound are not suitable for this purpose, and some other suitable material should be soldered to such terminals at the ends where contact is made with the keys. The terminals $d'$, $d^2$, $d^3$, $d^4$, $d^5$, $d^6$, $e'$, $e^2$, $e^3$, $e^4$, $e^5$, $e^6$, and $e^7$ are clamped tightly between insulating-bars $f^6$ and $f^7$, and they are all insulated from each other, except as they are connected through their respective magnets. The terminals $d'$, $d^2$, $d^3$, $d^4$, $d^5$, $e'$, $e^2$, $e^3$, $e^4$, $e^5$, and $e^6$ being thus in make-and-break relation with the keys $D'$, $D^2$, $D^3$, $D^4$, $D^5$, $E'$, $E^2$, $E^3$, $E^4$, $E^5$, and $E^6$ normally rest down upon the insulating-bar $f^8$. Their respective keys lie just below them, so that when a key is acted on by the operator it moves but a very short distance and then comes in contact with the corresponding terminal, ($d'$, $d^2$, $d^3$, $d^4$, $d^5$, $e'$, $e^2$, $e^3$, $e^4$, $e^5$, or $e^6$, as the case may be,) closing circuit with it and pressing it up against the insulating stop-rail $f^9$. The arrangement is such, it will be seen, as before stated, that the various keys $D'$, $D^2$, $D^3$, $D^4$, $D^5$, $E'$, $E^2$, $E^3$, $E^4$, $E^5$, and $E^6$, when in their normal positions, do not make connection with the corresponding terminal wires $d'$ $d^2$ $e'$ $e^2$, &c. The arrangement of the terminals $d^6$ and $d^7$, corresponding to the frames $D^6$ and $E^7$, it should be carefully observed, is quite different. They rest normally up against the insulating stop-rail $f^9$ and the corresponding frames $D^6$ and $E^7$ rest normally down upon them, closing circuit with them, the whole arrangement being such, as before pointed out, that any of the keys of the D group when acted upon serves to rock the frame $D^6$, so that it breaks connection with its wire $d^6$, and in like manner the different keys of the E group when acted upon serve to rock the frame $E^7$, so that it breaks connection with its wire $e^7$. Each of the keys of the D group, it will thus be seen, serves when depressed to break the connection between the frame $D^6$ and terminal $d^6$ and to establish its own proper connection, and each of the keys of the E group in like manner serves when depressed to break the connection between the frame $E^7$ and the terminals $e^7$ and to establish its own proper connections.

It remains to describe the spacing mechanism. The spacing mechanism which I prefer to employ is mechanically modeled in many particulars on that illustrated in Letters Patent of the United States No. 502,700, granted to me on August 8, 1893, to which Letters Patent reference is hereby had and made for a description of such spacing mechanism, (see particularly Figs. 13 and 13$^a$ of the drawings attached to said patent and pages 8 and 9 of the specification;) but while the present spacing mechanism is modeled to a great extent in mechanical points on that illustrated in the patent before mentioned it differs therefrom in being electrically operated and controlled. $c^{37}$ is the space-rack, attached to the carriage so that it moves with it.

H is the dog-carrying lever, made in two parts adjustable with relation to each other, so as to bring the loose dog and the fast dog nearer together or farther apart, as required.

$H^3$ is the fast dog; $H^4$, the loose dog.

$H^5$ is a bridle-lever connected with the fast dog and carrying an adjustable stop $H^{33}$.

$H^{52}$ is another lever, carrying another adjustable stop $H^{34}$.

Flanges $H^{41}$ $H^{41}$, &c., screwed fast to the downward extension $A^{41}$ of the top plate, serve to fulcrum the various levers above mentioned, the armature-levers hereinafter described, &c. $H^{42}$ $H^{42}$ are adjustable stops serving to limit the play of these levers.

$H^{30}$ is a lever connected by a link H with the dog-carrying lever and carrying a stop H, against which the loose dog $H^4$ rests when all the parts occupy their normal positions.

The other mechanical parts will require no description.

$H^{51}$ is the spacing-magnet. It is in circuit with the battery B, (see Fig. 1,) so that when the circuit of the battery is closed the current flows through the magnet $H^{51}$. $H^{52}$ is the armature of said magnet. When the current flows through the magnet $H^{51}$, it attracts the armature $H^{52}$, which thereupon tilts the dog-carrying lever H', raising the fast dog $H^3$ up into the teeth of the rack $c^{37}$ and withdrawing the loose dog $H^4$ from engagement with the rack, so that the loose dog when released from the rack moves under the influence of its own contractile spring $H^{36}$ until it is arrested by the stop $H^{33}$, attached to the lever $H^9$. The parts are all adjusted in such a manner that this movement of the loose dog is just sufficient to make one letter-space, and when the current is cut off from the magnet $H^{51}$ by the releasing of the keys the armature $H^{52}$ returns to its normal position, the fast dog is withdrawn from engagement with the rack $c^{37}$, the loose dog is again brought into engagement with it, and the carriage, no longer held back by the fast dog, moves on until it is arrested by the loose dog coming in contact with the stop $H^{32}$, so making a single space. This operation takes place with every letter that is printed. At the end of a word, or, rather, between words, (for the space might be made at the beginning of a word as well as at the end,) it becomes necessary to make a larger space. To this end the keyboard is furnished with a space-key G. This key is connected with one pole of the battery B by a branch wire $B^3$ from the wire $B'$. It is insulated from the metal strip $f^5$ and serves when acted upon by the operator to make connection with the wire $g$, which is connected through the coils of the space-enlarging magnet $H^{61}$ and space-magnet $H^{51}$ with the other pole of the battery B. The key G is to be acted on by the operator simultaneously with the key or keys which make the last letter of a word, and when acted on it closes circuit through the space-enlarging magnet $H^{61}$ and space-magnet $H^{51}$. The action of the space-magnet $H^{51}$ and related parts has already been made clear. The space-enlarging magnet $H^{61}$ when energized attracts its armature $H^{62}$, which carries the stop $H^{34}$ down out of the way of the loose dog, so that the loose dog when freed from the rack is now moved by its spring $H^{36}$ until it is arrested by the stop $H^{33}$, which stop is so set that the enlarged movement of the loose dog is sufficient to permit a movement of the carriage of two letter-spaces, when the various parts return to their normal positions. In a word, the space-magnet $H^{51}$, with its armature $H^{52}$, operates in the ordinary manner to actuate the spacing-dogs, and the space-enlarging magnet $H^{61}$, with its armature $H^{62}$, operates to enlarge the space by increasing the free movement of the loose dog.

$H^{37}$ and $H^{38}$ are contractile returning-springs serving to return the dog-carrying lever and the armatures to their normal positions.

$m$ is the paper-roll or platen; $m'$, the frame of the carriage; $m^2$, the back rod on which the carriage runs, and $m^3$ is the frame hinged to the carriage-frame and to which the space-rack $c^{37}$ is attached.

A great variety of modifications may be made without departing from the essentials of my invention.

Among the important features of the permutational character-selecting mechanism illustrated in the accompanying drawings and hereinbefore described may be mentioned the following:

(a) The controlling elements (by which I mean the circuit-closers, as $D'$, $D^2$, $D^3$, $D^4$, $D^5$, and $D^6$, $E'$, $E^2$, $E^3$, $E^4$, $E^5$, $E^6$, and $E^7$, with the corresponding springs $d'$, $d^2$, $d^3$, $d^4$, $d^5$, $d^6$, $e'$, $e^2$, $e^3$, $e^4$, $e^5$, $e^6$, and $e^7$, or their equivalents) form two distinct but coacting groups or sets. Some one of the controlling elements in the one group must always coact with some one of the controlling elements in the other group to make any character, and each type-bar is controlled by the coacting of two controlling elements belonging one to the one group and the other to the other group. This, it is thought, is broadly new. By this feature it is never necessary to bring more than two controlling elements into action nor to depress more than two keys to make any character. In all former permutational character-selecting mechanisms, so far as I am aware, an indefinite number of controlling elements—often three, and sometimes four, five, or six—are brought into action and a corresponding number of keys depressed in order to produce the character desired. The controlling elements illustrated in the drawings are electrical controlling elements, for they operate electrically to affect different circuits; but other kinds of controlling elements may doubtless be used. In another pending application, Serial No. 609,489, filed October 21, 1896, two sets or groups of mechanical controlling elements or mechanical controlling devices coacting to operate the controlled parts are described and claimed.

(b) The keys $D'$, $D^2$, $D^3$, $D^4$, and $D^5$ constitute one distinct group of keys and the keys $E'$, $E^2$, $E^3$, $E^4$, $E^5$, and $E^6$ constitute another distinct group of keys. The magnets $b\ b\ b$, &c., with the type-bars $a\ a\ a$, controlled by said magnets, resolve themselves into corresponding groups. Each of the keys $E'$, $E^2$, $E^3$, $E^4$, $E^5$, and $E^6$ serves to control a certain group of electromagnets $b\ b$ and type-bars $a\ a$, and each of the keys $D'$, $D^2$, $D^3$, $D^4$, and $D^5$, coacting with the different keys $E'$, $E^2$, $E^3$, $E^4$, $E^5$, and $E^6$, serves to determine what one of the magnets $b\ b$ and type-bars $a\ a$ of the group shall be brought into action.

(c) Another important feature of the invention consists in the employment of the frames $D^6$ and $D^7$ or their equivalents, the frame $D^6$ serving as an alternative to the keys of the D group and the frame $E^7$ serving as an alternative to the keys of the E group. If the frame $D^6$ were omitted, no letter could be made from any of the keys $E'$, $E^2$, $E^3$, $E^4$, $E^5$, or $E^6$ depressed by itself alone. It would be necessary to depress at the same time some one of the D-group keys, and in like manner if the frame $E^7$ were omitted no letter could be made from any of the keys $D'$, $D^2$, $D^3$, $D^4$, or $D^5$ depressed by itself alone. It would be necessary to depress at the same time some one of the keys $E'$, $E^2$, $E^3$, $E^4$, $E^5$, or $E^6$; but the frame $D^6$ serves the function of a D-group key when no D-group key is depressed, and the frame $E^7$ serves the function of an E-group key when no E-group key is depressed.

My invention may be applied, as before mentioned, to type-setting and linotype machines, as well as to type-writing machines. This may be done in a variety of ways. Thus, for example, instead of employing the various magnets $b\ b$, &c., (illustrated, with their connections, diagrammatically in Fig. 1,) to operate type-levers of a writing-machine they might very obviously be connected to operate the keys of any sort of type-writing machine, type-setting machine, or linotype-machine, so that energizing the various magnets would have the effect of depressing corresponding keys of a type-writing, type-setting, or linotype machine, or in any of these machines, particularly in a type-setting or linotype machine, the electromagnets might obviously be connected to operate those parts which the keys of such machines operate (such as the escapement devices of a linotype-machine) and which correspond respectively with the different letters and other characters.

Fig. 8 illustrates the electromagnets $b\ b$, connected to operate the escapement devices of a Mergenthaler linotype-machine, the mechanism of Fig. 8 (with the exception of the magnets $b\ b$) being of the sort illustrated and fully described in the patent to Mergenthaler, No. 436,532, dated September 16, 1890, to which patent reference is hereby had and made for a full description of such mechanism. The lettering in my Fig. 8, however, is different from that of the same part in the Mergenthaler patent above referred to, No. 436,532. The armature $b^2$ of each electromagnet is connected by the link $b^6$ to operate the corresponding key-lever P, (centered at $p$,) which operates the rod Q, that actuates the escapement-lever R and the escapement pawls or dogs $r'\ r^2$. The shafts or drums $q^7\ q^7$, with the cams $q^6\ q^6$ and the springs $q^2\ q^2$, carrying the little rollers $q^3\ q^3$, belonging to the construction described in Mergenthaler's patent before mentioned, No. 436,532, may obviously be dispensed with, the magnets $b\,b$ being connected direct to operate the escapement-lever R, as illustrated in Fig. 9.

A person who has mastered the description of my invention given in this specification and who is skilled in the art pertaining to typesetting and linotype machines will have no difficulty in applying my invention to such machines, and it will be unnecessary to advert further to the matter. I desire full protection for all such uses and applications of my invention.

My invention, it will be obvious, may also be applied to printing-telegraphs, and for all such uses I desire full protection.

What I claim as my invention, and desire to secure by Letters Patent, is—

1. In a type-writing machine, linotype-machine, type-setting machine, or other similar instrument, a permutational magnet-selecting device, operating with a single current to energize the magnet required, and including in combination with the electromagnets to be controlled, two groups of circuit-closing devices; each electromagnet having a break in its circuit controlled by some one of the circuit-closing devices belonging to one of the two groups of circuit-closing devices above mentioned, and another break in its circuit controlled by some one of the circuit-closing devices belonging to the other one of the groups of circuit-closing devices above mentioned, the different magnets aforesaid being energized each as required, and each at a single operation, by the simultaneous closing circuit of two circuit-closing devices belonging one to one of the two groups above mentioned and the other to the other of the two groups above mentioned; the different magnets being controlled by different combinations of two circuit-closing devices, belonging one to one of the two groups of circuit-closing devices above mentioned and the other to the other one of the two groups of circuit-closing devices aforesaid.

2. In a type-writing machine, linotype-machine, type-setting machine, or other similar instrument, a permutational magnet-selecting device, operating with a single current to energize the electromagnet required, and including in combination with a suitable source of current and the electromagnets to be energized, two groups of circuit-controllers; each electromagnet having one terminal in make-and-break relation with some one of the circuit-controllers belonging to one of the two groups of circuit-controllers above mentioned, and its other terminal in make-and-break relation with some one of the circuit-controllers belonging to the other one of the two groups of circuit-controllers above mentioned; the whole being arranged in such a manner that in general so soon as connection is made by any two of the circuit-controllers belonging one to one of the groups and the other to the other of the groups of circuit-controllers above mentioned, the current flows through and energizes the corresponding electromagnet; the different magnets being controlled by different combinations of two circuit-controllers, belonging one to one of the two groups of circuit-controllers above mentioned and the other to the other one of said two groups of circuit-controlling devices.

3. In a type-writing machine, linotype-machine, type-setting machine, or other similar instrument, a permutational magnet-selecting device, operating with a single current to energize the magnet required, and including in combination with the electromagnets to be controlled, two groups of circuit-closing devices, and a set of manipulating-keys disposed in juxtaposition and adapted to be manipulated all with one hand of the operator, said keys controlling said circuit-closing devices; each electromagnet having a break in its circuit controlled by some one of the circuit-closing devices belonging to one of the groups of circuit-closing devices above mentioned, and another break in its circuit controlled by some one of the circuit-closing devices of the other group of circuit-closing devices above mentioned, the different magnets aforesaid being energized each as required and at a single operation by the simultaneous closing circuit of two circuit-closing devices, belonging one to one of the two groups above mentioned and the other to the other of the two groups above mentioned; the different magnets being controlled by different combinations of two circuit-closing devices, belonging one to one of the two groups of circuit-closing devices above mentioned and the other to the other one of the two groups of circuit-closing devices aforesaid.

4. In a type-writing machine, or other similar instrument, and in combination, a multiplicity of type-bars, striking to a common printing-center; a multiplicity of electromagnets, serving to operate said type-bars; and a permutational magnet-selecting device, operating with a single current to energize the magnet required and including two groups of circuit-closing devices; each electromagnet having a break in its circuit controlled by some one of the circuit-closing devices, belonging to one of the two groups of circuit-closing devices above mentioned, and another break in its circuit controlled by some one of the circuit-controlling devices belonging to the other one of the two groups of circuit-closing devices above mentioned; the different magnets aforesaid being energized, each as required, and each at a single operation, by the simultaneous closing circuit of two circuit-closing devices, belonging one to one of the two groups above mentioned and the other to the other of the two groups above mentioned; the different magnets being controlled by different combinations of two circuit-closing devices, belonging one to one of the two groups above mentioned and the other to the other one of the two groups of circuit-closing devices aforesaid.

5. In a type-writing machine, or other similar instrument, and in combination, a multiplicity of type-bars, striking to a common printing-center; a multiplicity of electromagnets, serving to impel said type-bars; and a permutational magnet-selecting device, operating with a single current to energize the electromagnet required, and including in combination with a suitable source of current, two groups of circuit-controllers, each electromagnet having one terminal in make-and-break relation with some one of the circuit-controllers belonging to one of the two groups of circuit-controllers above mentioned, and its other terminal in make-and-break relation with some one of the circuit-controllers belonging to the other one of the two groups of circuit-controllers above mentioned; the whole being arranged in such a manner that in general so soon as connection is made by any two of the circuit-controllers belonging one to one of the groups and the other to the other of the groups of circuit-controllers above mentioned, the current flows through and energizes the corresponding electromagnet; the different magnets being controlled by different combinations of two circuit-controllers, belonging one to one of the two groups of circuit-controlling devices above mentioned and the other to the other one of said two groups of circuit-controlling devices.

6. In a type-writing machine or other similar instrument, and in combination, a multiplicity of type-bars, striking to a common printing-center; a multiplicity of electromagnets, serving to impel said type-bars; and a permutational magnet-selecting device, having in combination with the electromagnets before mentioned to be controlled, two groups of circuit-closing devices, and a set of manipulating-keys, disposed in juxtaposition and adapted to be manipulated all with one hand of the operator, said keys controlling said circuit-closing devices; each electromagnet having a break in its circuit, controlled by some one of the circuit-closing devices belonging to one of the groups of circuit-closing devices above mentioned, and another break in its circuit controlled by some one of the circuit-closing devices of the other group of circuit-closing devices above mentioned; the different magnets aforesaid being energized each as required and at a single operation by the simultaneous closing circuit of two circuit-closing devices belonging one to one of the two groups of circuit-closing devices above mentioned and the other to the other of the two groups of circuit-closing devices above mentioned; the different magnets being controlled by different combinations of two circuit-closing devices, belonging one to one of the two groups of circuit-closing devices above mentioned and the other to the other one of the two groups of circuit-closing devices aforesaid.

7. In a permutational character-selecting device, the combination of (*a*) a plurality of groups of electromagnets; (*b*) keys, less in number by one than the number of said groups of electromagnets, each key corresponding to one of the groups of electromagnets aforesaid and serving, when acted upon by the operator, to close a break in the circuit of each of the electromagnets of its group; (*c*) another group of electromagnets; (*d*) a device corresponding thereto and serving, when in its normal position, to close a break in the circuit of each of the electromagnets of its group; the keys above mentioned each serving, when acted upon by the operator to close a break in each of the circuits of the electromagnets of its group and to effect a movement of the device last above mentioned, thereby opening breaks in the circuits of the group of electromagnets controlled by such device.

8. In a permutational character-selecting device, the combination of (*a*) a plurality of groups of electromagnets; (*b*) finger-keys, each corresponding to and serving to control one of the groups of electromagnets above mentioned; and other controlling devices, each controlling an electromagnet in each of a plurality of the groups of electromagnets above mentioned; the keys above mentioned operating to control or determine the group of electromagnets in which one magnet is to be energized and the other controlling devices aforesaid serving to control or determine which electromagnet in the group shall be energized.

9. In a permutational character-selecting device, the combination of (*a*) a plurality of groups of electromagnets; (*b*) keys, each corresponding to and serving to control one of the groups of electromagnets above mentioned; and other keys each serving to control an electromagnet in each of a plurality of the groups before mentioned.

10. In a permutational character-selecting device, the combination of (*a*) a plurality of groups of electromagnets; (*b*) finger-keys, each corresponding to and serving to control one of the groups of electromagnets above mentioned; and (*c*) thumb-keys, each serving to control an electromagnet in each of a plurality of the groups before mentioned; different magnets being energized by the simultaneous depressing of different combinations of two keys, being one a finger-key and the other a thumb-key.

11. In a type-writing machine, or other similar instrument, a multiplicity of type-bars, striking to a common printing-center, in combination with permutational character-selecting mechanism, including (*a*) a plurality of groups of electromagnets, said electromagnets operating to impel the type-bars before mentioned; (*b*) keys, less in number by one than the number of said groups of electromagnets, each key corresponding to one of the groups of electromagnets aforesaid, and serving when acted upon by the operator, to close a break in the circuit of each of the electromagnets of its group; (c) another group of electromagnets; (d) a device corresponding thereto, and serving, when in its normal position, to close a break in the circuit of each of the electromagnets of its group; the keys above mentioned each serving, when acted upon by the operator to close a break in each of the circuits of the electromagnets of its group and to effect a movement of the device last above mentioned thereby opening breaks in the circuits of the group of electromagnets to which no one of the keys above mentioned corresponds.

12. In a type-writing machine or other similar instrument, a multiplicity of type-bars, striking to a common printing-center, in combination with permutational character-selecting mechanism including (a) a plurality of groups of electromagnets; said electromagnets operating to impel the type-bars before mentioned; (b) keys each corresponding to and serving to control one of the groups of electromagnets above mentioned; and other controlling devices, each controlling an electromagnet in each of a plurality of the groups of electromagnets above mentioned; the keys above mentioned operating to control or determine the group of electromagnets in which one magnet is to be energized and the other controlling devices aforesaid serving to control or determine which electromagnet in the group shall be energized.

13. In a type-writing machine or other similar instrument, a multiplicity of type-bars, striking to a common printing-center, in combination with permutational character-selecting mechanism including (a) a plurality of groups of electromagnets; (b) keys, each corresponding to and serving to control one of the groups of electromagnets above mentioned; and (c) other keys, each serving to control an electromagnet in each of a plurality of the groups before mentioned.

14. In a type-writing machine or other similar instrument, a multiplicity of type-bars, striking to a common printing-center, in combination with permutational character-selecting mechanism including (a) a plurality of groups of electromagnets; said electromagnets operating to impel the type-bars before mentioned; (b) finger-keys, each corresponding to and serving to control one of the groups of electromagnets above mentioned; and (c) thumb-keys, each serving to control an electromagnet in each of a plurality of the groups before mentioned; different magnets being energized by the simultaneous depressing of different combinations of two keys, being one a finger-key and the other a thumb-key.

15. In a type-writing machine, linotype-machine, type-setting machine, or other similar instrument and in combination, a multiplicity of electromagnets, arranged with regard to their electrical connections in a plurality of groups; a keyboard having a number of operating-keys less than the number of electromagnets, said operating-keys consisting of two distinct but coöperating groups; the keys of the one group serving to determine the group of magnets out of which one is to be energized, the keys of the other group serving to determine which magnet in such group shall be energized; the whole arrangement being such that in general the different pairs or permutations of keys belonging one key to one group of keys and the other key to the other group of keys above mentioned, acting simultaneously, energize different magnets respectively; so that a large number of electromagnets are controlled by a much smaller number of keys.

16. In a type-writing machine or other similar instrument, and in combination, a multiplicity of type-bars, striking to a common printing-center; a multiplicity of electromagnets, serving to impel the type-bars before mentioned; said electromagnets being arranged with regard to their electrical connections in a plurality of groups; a keyboard having a number of operating-keys less than the number of electromagnets, said operating-keys consisting of two distinct but coöperating groups; the keys of the one group serving to determine the group of magnets out of which one is to be energized; the keys of the other group serving to determine which electromagnet in such group shall be energized; the whole arrangement being such that in general the different pairs or permutations of keys belonging one key to one group of keys and the other key to the other group of keys above mentioned, acting simultaneously, energize different magnets respectively; so that a large number of electromagnets are controlled by a much smaller number of keys.

17. In a type-writing machine, linotype-machine, type-setting machine, or other similar instrument, a multiplicity of electromagnets in combination with a smaller number of circuit-closers, said circuit-closers constituting electrically two distinct groups; the parts being constructed, arranged and connected in such a manner that each electromagnet has one of its terminals in make-and-break relation with a circuit-closer belonging to one of the groups of circuit-closers above mentioned, and its other terminal in make-and-break relation with a circuit-closer belonging to the other group of circuit-closers above mentioned; different magnets being connected respectively with different pairs of circuit-closers; at least one of the groups of circuit-closers above mentioned including (a) one or more keys, arranged in such a manner that they make connection when acted on by the operator, and (b) another circuit-closer, serving as an alternative to the key or keys of its group, the key or keys of its group serving, when acted upon by the operator to make their own connections, to break the connections made by the circuit-closer aforesaid.

18. In a type-writing machine, linotype-machine, type-setting machine, or other similar instrument, a multiplicity of electromagnets in combination with a smaller number of circuit-closers, said circuit-closers constituting electrically two distinct groups; the parts being constructed arranged and connected in such a manner that each electromagnet has one of its terminals in make-and-break relation with a circuit-closer belonging to one of the groups of circuit-closers above mentioned, and its other terminal in make-and-break relation with a circuit-closer belonging to the other group of circuit-closers above mentioned; different magnets being connected respectively with different pairs of circuit-closers; one of the groups of circuit-closers above mentioned including (a) a plurality of keys, serving to make connection when acted on by the operator, and (b) another circuit-closer, serving as an alternative circuit-closer to the keys of its group, the keys of its group serving, in making their own connections, to break the connection made by the circuit-closer aforesaid; the other group of circuit-closers above mentioned including (a) one or more keys, serving to make connection, when acted upon by the operator, and (b) another circuit-closer, serving as an alternative circuit-closer to the key or keys of its group, the key or keys of its group serving, when acted on by the operator to make their own connections, to break the connection made by the circuit-closer aforesaid.

19. In a type-writing machine, or other similar instrument, a multiplicity of type-bars, striking to a common printing-center, and a multiplicity of electromagnets, serving for the impelling of said type-bars, in combination with a number of circuit-closers smaller than the number of electromagnets controlled thereby; said circuit-closers constituting electrically two distinct groups the parts being constructed, arranged and connected in such a manner that each electromagnet has one of its terminals in make-and-break relation with a circuit-closer belonging to one of the groups of circuit-closers above mentioned, and its other terminal in make-and-break relation with a circuit-closer belonging to the other group of circuit-closers above mentioned; different magnets being connected respectively with different pairs of circuit-closers; one of the groups of circuit-closers above mentioned including (a) a plurality of keys, serving to make connection, when acted on by the operator, and (b) another circuit-closer, serving as an alternative circuit-closer to the keys of its group, the keys of its group serving, in making their own connections, to break the connection made by the circuit-closer aforesaid; the other group of circuit-closers above mentioned including (a) one or more keys, serving to make connection, when acted on by the operator, and (b) another circuit-closer, serving as an alternative circuit-closer to the key or keys of its group; the key or keys of its group serving when acted on by the operator to make their own connections, to break the connections made by the circuit-closer aforesaid.

20. In combination, a multiplicity of character-controlling devices; a multiplicity of electromagnets actuating said character-controlling devices, said electromagnets being arranged electrically in groups; a group of circuit-closers, corresponding in number to the number of groups of electromagnets; and another group of circuit-closers, corresponding in number to the number of electromagnets in a group; the parts being constructed, arranged and connected in such a manner that in general all the electromagnets in a group have one terminal in make-and-break relation with one of the circuit-closers of the group of circuit-closers first in this paragraph mentioned; the different groups of magnets being respectively in make-and-break relation as groups, with the different circuit-closers of the group of circuit-closers first in this paragraph mentioned; each magnet in a group having its other terminal in make-and-break relation with one of the circuit-closers of the second group of circuit-closers in this paragraph mentioned; the different magnets, in general, of each group of magnets being respectively in make-and-break relation with different circuit-closers of the aforesaid second-mentioned group of circuit-closers.

21. In a type-writing machine, and in combination, a multiplicity of type-levers, arranged to strike to a common printing-center; a multiplicity of electromagnets, actuating said type-levers, said electromagnets being arranged electrically in groups; a group of circuit-closers, corresponding in number to the number of groups of electromagnets aforesaid; and another group of circuit-closers, corresponding in number to the number of electromagnets in a group; the parts being constructed, arranged and connected in such a manner that in general all the electromagnets in a group have one terminal in make-and-break relation with one of the circuit-closers of one of the groups of circuit-closers first in this paragraph mentioned; the different groups of magnets being respectively in make-and-break relation as groups, with the different circuit-closers of the group of circuit-closers first in this paragraph mentioned; each magnet in a group having its other terminal in make-and-break relation with one of the circuit-closers of the second group of circuit-closers in this paragraph mentioned; the different magnets, in general, of each group of magnets being respectively in make-and-break relation with different circuit-closers of the aforesaid second-mentioned group of circuit-closers.

22. In a type-writing machine, and in combination, a multiplicity of type-levers, arranged to strike to a common printing-center; a multiplicity of coil-and-plunger electromagnets, serving to actuate said type-levers; a number of keys less than the number of electromagnets, and electrical connections arranged in a suitable manner so that they form with the keys a permutational character-selecting device, whereby different magnets are energized and different letters printed by the keys acting singly and in various combinations.

23. In a type-writing machine, and in combination, a multiplicity of type-levers, arranged to strike to a common printing-center; a multiplicity of coil-and-plunger electromagnets, annularly disposed and serving to actuate the type-bars aforesaid; a number of keys less than the number of electromagnets; and electrical connections arranged in a suitable manner so that they form with the keys a permutational character-selecting device, whereby different magnets are energized and differents letters printed by the keys acting singly and in various combinations.

24. In a type-writing machine, and in combination, a multiplicity of type-levers, arranged in such a manner that they strike to a common printing-center; a multiplicity of stopped coil-and-plunger electromagnets, operating to actuate said type-levers; a number of keys less than the number of electromagnets; and electrical connections arranged in a suitable manner so that they form, with the keys, a permutational character-selecting device, whereby different magnets are energized and different letters printed by the various keys acting singly and in various combinations.

25. In a type-writing machine, and in combination, a multiplicity of type-levers, arranged to strike to a common printing-center; electromagnetic mechanism serving to impel said type-bars; permutational character-selecting mechanism, having a number of keys less than the number of type-bars, said keys acting singly and in various combinations to cause the impelling of the different type-bars aforesaid, each as required; a paper-carriage; spacing mechanism therefor, whereby the paper-carriage is advanced step by step, as the successive letters are printed; a space-enlarging device, whereby the letter-space movement of the paper-carriage is increased to allow for an interverbal space; and a key, controlling said space-enlarging device, said key being arranged in juxtaposition to the keys controlling the type-bars, so that it can be conveniently depressed simultaneously with such keys; the whole being constructed, arranged and connected in such manner that the key last mentioned, when depressed simultaneously with the type-bar-controlling keys, serves to increase the letter-space movement of the paper-carriage, so that an interverbal space is made by the operator simultaneously with a letter.

26. In a type-writing machine and in combination, a multiplicity of type-levers, arranged to strike to a common printing-center; keys controlling said type-levers; a paper-carriage; spacing mechanism therefor, whereby the paper-carriage is advanced step by step as the successive letters are printed; a space-enlarging device, whereby the movement of the carriage is increased to allow for an interverbal space; an electromagnet serving to actuate said space-enlarging device; and a key controlling said electromagnet; said key being arranged in juxtaposition to the keys controlling the type-levers, so that it can be conveniently depressed simultaneously with such keys; the whole being constructed, arranged and connected in such a manner that the key last mentioned, when depressed simultaneously with the type-bar-controlling keys, serves to increase the letter-space movement of the carriage, so that an interverbal space is made by the operator simultaneously with the letter.

27. In a type-writing machine and in combination, a multiplicity of type-levers, arranged in such a manner that they strike to a common printing-center; a multiplicity of electromagnets, serving for the actuating of said type-levers; permutational character-selecting mechanism, having a number of keys less than the number of type-bars, said keys acting singly and in various combinations to cause the impelling of the different type-bars aforesaid, each as required; a paper-carriage; spacing mechanism therefor, whereby the paper-carriage is advanced step by step, as the successive letters are printed; a space-enlarging device, whereby the letter-space movement of the paper-carriage is increased to allow for an interverbal space; and a key, controlling said space-enlarging device, said key being arranged in juxtaposition to the keys controlling the type-levers, so that it can be conveniently depressed simultaneously with such keys; the whole being constructed, arranged and connected in such manner that the key last mentioned, when depressed simultaneously with the type-bar-controlling keys, serves to increase the letter-space movement of the paper-carriage, so that an interverbal space is made by the operator simultaneously with a letter.

28. In a type-writing machine, linotype-machine, type-setting machine or other similar instrument, permutational character-selecting mechanism, including in combination with a set of controlled parts, two sets of controlling devices, coacting to operate the controlled parts aforesaid; each of said controlled parts being operated by the coacting of two controlling devices, belonging one to one of the sets of controlling devices before mentioned, and the other to the other set of controlling devices before mentioned.

29. In a type-writing machine, linotype-machine, type-setting machine, or other similar instrument, permutational character-selecting mechanism, including in combination with a set of controlled parts, two sets of controlling devices, coacting to operate the controlled parts before mentioned, each of said controlled parts being operated by the coacting of two controlling devices, belonging one to one of the sets of controlling devices before mentioned, and the other to the other set of controlling devices before mentioned; a normally-coacting device in one of the sets of controlling devices before mentioned; and means whereby said normally-coacting device is thrown out of action when any other controlling device of the same set is brought into action.

30. In a type-writing machine, linotype-machine, type-setting machine or other similar instrument, permutational character-selecting mechanism, including in combination with a set of controlled parts, two sets of controlling devices, coacting to operate the controlled parts before mentioned; each of said controlled parts being operated by the coacting of two controlling devices, belonging one to one of the sets of controlling devices before mentioned, and the other to the other set of controlling devices before mentioned; a normally-coacting device, in each of the sets of controlling devices before mentioned; and means whereby the normally-coacting device of each set is thrown out of action, when any other controlling device of the same set is brought into action.

31. In a type-writing machine or other similar instrument, and in combination therein with the type-bars, permutational character-selecting mechanism having two sets of controlling elements coacting to operate the type-bars aforesaid; each of said type-bars being operated by the coacting of two controlling elements, belonging one to one of the sets of controlling elements before mentioned, and the other to the other set of controlling elements before mentioned.

32. In a type-writing machine or other similar instrument, and in combination therein with the type-bars, permutational character-selecting mechanism having two sets of controlling elements coacting to operate the type-bars aforesaid, each of said type-bars being operated by the coacting of two controlling elements, belonging one to one of the sets of controlling elements before mentioned, and the other to the other set of controlling elements before mentioned; a normally-coacting controlling element in each of the sets of controlling elements before mentioned; and means whereby the normally-coacting controlling element in each set is thrown out of action whenever any other controlling element of the same set is brought into action.

33. In a permutational type-bar-selecting mechanism, for a type-writing machine, or other similar instrument, the combination, with the type-bars, of keys, each controlling a group of said type-bars, and means whereby the different type-bars of a group are brought into action, each as required.

34. In a permutational type-bar-selecting mechanism, for a type-writing machine or other similar instrument, the combination with the groups of type-bars of (a) keys, less in number than the groups of type-bars above mentioned, said keys each corresponding to and serving to control one of the groups of type-bars above mentioned; and (b) a device serving to control one of the groups of type-bars to which no one of the keys above mentioned corresponds; the keys above mentioned serving to control the device last above mentioned.

35. In a permutational type-bar-selecting mechanism, the combination with the groups of type-bars of (a) keys, less in number than the groups of type-bars above mentioned, each key corresponding to and serving to control one of said groups of type-bars; (b) a device serving to control one of the groups of type-bars above mentioned with which no one of the keys above mentioned corresponds; the keys above mentioned controlling the device last above mentioned; and (c) means whereby the different type-bars of a group are brought into action, each as required.

36. In a permutational type-bar-selecting mechanism, the combination with the groups of type-bars of (a) keys, less in number than the groups of type-bars above mentioned, each key corresponding to and serving to control one of said groups of type-bars; (b) a device serving to control one of the groups of type-bars above mentioned with which no one of the keys above mentioned corresponds; the keys above mentioned controlling the device last above mentioned; and (c) other keys whereby the different type-bars of a group are brought into action, each as required.

37. In a permutational type-bar-selecting mechanism, the combination, with the type-bars, of the finger-keys, each serving to control a group of said type-bars, and the thumb-keys, adapted to act simultaneously with the finger-keys above mentioned, thereby to bring the different type-bars of each group into action, each type-bar as required.

Signed at Washington, District of Columbia, this 13th day of December, A. D. 1895, in the presence of the subscribing witnesses whose names are hereto annexed.

THADDEUS CAHILL.

Witnesses:
GEO. F. CAHILL,
ARTHUR T. CAHILL.